US009843521B2

(12) United States Patent
Kamat et al.

(10) Patent No.: US 9,843,521 B2
(45) Date of Patent: *Dec. 12, 2017

(54) PROCESSING PACKET HEADER WITH HARDWARE ASSISTANCE

(71) Applicant: A10 Networks, Inc., San Jose, CA (US)

(72) Inventors: Gurudeep Kamat, San Jose, CA (US); Ian E. Davis, Fremont, CA (US); Rajkumar Jalan, Saratoga, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,043

(22) Filed: Mar. 13, 2017

(65) Prior Publication Data

US 2017/0187631 A1 Jun. 29, 2017

Related U.S. Application Data

(63) Continuation of application No. 13/480,494, filed on May 25, 2012, now Pat. No. 9,596,286.

(51) Int. Cl.
*H04L 12/56* (2006.01)
*H04L 12/803* (2013.01)
(Continued)

(52) U.S. Cl.
CPC ............ *H04L 47/125* (2013.01); *H04L 47/31* (2013.01); *H04L 67/02* (2013.01); *H04L 69/22* (2013.01)

(58) Field of Classification Search
None
See application file for complete search history.

(56) References Cited

U.S. PATENT DOCUMENTS

| 4,720,850 A | 1/1988 | Oberlander et al. |
| 4,864,492 A | 9/1989 | Blakely-Fogel et al. |

(Continued)

FOREIGN PATENT DOCUMENTS

| CN | 1921457 | 2/2007 |
| CN | 1937591 | 3/2007 |

(Continued)

OTHER PUBLICATIONS

Cardellini et al., "Dynamic Load Balancing on Web-server Systems", IEEE Internet Computing, val. 3, No. 3, pp. 28-39, May-Jun. 1999.

(Continued)

*Primary Examiner* — Kevin C. Harper
*Assistant Examiner* — Derrick V Rose
(74) *Attorney, Agent, or Firm* — AMPACC Law Group, LLP; Keith Kline

(57) ABSTRACT

In processing data packet headers, a packet pre-processor is configured with at least one predetermined header field identifier. The packet pre-processor detects at least one header field identifier in a header field of a data packet received over a communication session between a host and a server, matches the predetermined header field identifier to the header field identifier in the data packet, generates a header report block comprising information corresponding to the header field identifier in the data packet, and sends the data packet and the header report block to a processor module for processing the data packet based on the header report block. The processor module receives the data packet and the header report block from the packet pre-processor, retrieves a service policy using the header report block, applies the service policy to the data packet, and sends the data packet to the host or the server.

20 Claims, 9 Drawing Sheets

(51) Int. Cl.
*H04L 29/08* (2006.01)
*H04L 12/833* (2013.01)
*H04L 29/06* (2006.01)

(56) References Cited

U.S. PATENT DOCUMENTS

| | | | |
|---|---|---|---|
| 4,882,699 | A | 11/1989 | Evensen |
| 5,218,676 | A | 6/1993 | Ben-Ayed et al. |
| 5,293,488 | A | 3/1994 | Riley et al. |
| 5,432,908 | A | 7/1995 | Heddes et al. |
| 5,781,550 | A | 7/1998 | Templin et al. |
| 5,875,185 | A | 2/1999 | Wang et al. |
| 5,931,914 | A | 8/1999 | Chiu |
| 6,141,749 | A | 10/2000 | Coss et al. |
| 6,167,428 | A | 12/2000 | Ellis |
| 6,324,286 | B1 | 11/2001 | Lai et al. |
| 6,360,265 | B1 | 3/2002 | Falck et al. |
| 6,363,075 | B1 | 3/2002 | Huang et al. |
| 6,389,462 | B1 | 5/2002 | Cohen et al. |
| 6,415,329 | B1 | 7/2002 | Gelman et al. |
| 6,519,243 | B1 | 2/2003 | Nonaka et al. |
| 6,535,516 | B1 | 3/2003 | Leu et al. |
| 6,578,066 | B1 | 6/2003 | Logan et al. |
| 6,658,114 | B1 | 12/2003 | Farn et al. |
| 6,832,322 | B1 | 12/2004 | Boden et al. |
| 7,013,338 | B1 | 3/2006 | Nag et al. |
| 7,058,789 | B2 | 6/2006 | Henderson et al. |
| 7,058,973 | B1 | 6/2006 | Sultan |
| 7,086,086 | B2 | 8/2006 | Ellis |
| 7,111,162 | B1 | 9/2006 | Bagepalli et al. |
| 7,266,604 | B1 | 9/2007 | Nathan et al. |
| 7,284,272 | B2 | 10/2007 | Howard et al. |
| 7,290,050 | B1 | 10/2007 | Smith et al. |
| 7,308,710 | B2 | 12/2007 | Yarborough |
| 7,370,100 | B1 | 5/2008 | Gunturu |
| 7,373,500 | B2 | 5/2008 | Ramelson et al. |
| 7,406,709 | B2 | 7/2008 | Maher, III et al. |
| 7,441,270 | B1 | 10/2008 | Edwards et al. |
| 7,451,312 | B2 | 11/2008 | Medvinsky et al. |
| 7,516,485 | B1 | 4/2009 | Lee et al. |
| 7,529,242 | B1 | 5/2009 | Lyle |
| 7,568,041 | B1 | 7/2009 | Turner et al. |
| 7,583,668 | B1 | 9/2009 | Mayes et al. |
| 7,591,001 | B2 | 9/2009 | Shay |
| 7,603,454 | B2 | 10/2009 | Piper |
| 7,716,369 | B2 | 5/2010 | Le Pennec et al. |
| 7,779,130 | B1 | 8/2010 | Toutonghi |
| 7,908,651 | B2 | 3/2011 | Maher |
| 8,079,077 | B2 | 12/2011 | Chen et al. |
| 8,244,876 | B2 | 8/2012 | Sollee |
| 8,255,644 | B2 | 8/2012 | Sonnier et al. |
| 8,291,487 | B1 | 10/2012 | Chen et al. |
| 8,327,128 | B1 | 12/2012 | Prince et al. |
| 8,332,925 | B2 | 12/2012 | Chen et al. |
| 8,387,128 | B1 | 2/2013 | Chen et al. |
| 8,464,333 | B1 | 6/2013 | Chen et al. |
| 8,520,615 | B2 | 8/2013 | Mehta et al. |
| 8,595,383 | B2 | 11/2013 | Chen et al. |
| 8,595,819 | B1 | 11/2013 | Chen et al. |
| RE44,701 | E | 1/2014 | Chen et al. |
| 8,904,512 | B1 | 12/2014 | Chen et al. |
| 8,914,871 | B1 | 12/2014 | Chen et al. |
| 8,918,857 | B1 | 12/2014 | Chen et al. |
| RE45,347 | E | 1/2015 | Chun et al. |
| 8,943,577 | B1 | 1/2015 | Chen et al. |
| 9,032,502 | B1 | 5/2015 | Chen et al. |
| 9,118,618 | B2 | 8/2015 | Davis |
| 9,118,620 | B1 | 8/2015 | Davis |
| 9,124,550 | B1 | 9/2015 | Chen et al. |
| 9,258,332 | B2 | 2/2016 | Chen et al. |
| 9,344,456 | B2 | 5/2016 | Chen et al. |
| 9,596,286 | B2 * | 3/2017 | Kamat .................. H04L 67/02 |
| 2001/0015812 | A1 | 8/2001 | Sugaya |
| 2001/0023442 | A1 | 9/2001 | Masters |
| 2002/0026531 | A1 | 2/2002 | Keane et al. |
| 2002/0046348 | A1 | 4/2002 | Brustoloni |
| 2002/0053031 | A1 | 5/2002 | Bendinelli et al. |
| 2002/0141448 | A1 | 10/2002 | Matsunaga |
| 2002/0143955 | A1 | 10/2002 | Shimada et al. |
| 2003/0065950 | A1 | 4/2003 | Yarborough |
| 2003/0081624 | A1 | 5/2003 | Aggarwal et al. |
| 2003/0088788 | A1 | 5/2003 | Yang |
| 2003/0135653 | A1 | 7/2003 | Marovich |
| 2003/0152078 | A1 | 8/2003 | Henderson et al. |
| 2003/0167340 | A1 | 9/2003 | Jonsson |
| 2003/0229809 | A1 | 12/2003 | Wexler et al. |
| 2004/0054920 | A1 | 3/2004 | Wilson et al. |
| 2004/0107360 | A1 | 6/2004 | Herrmann et al. |
| 2004/0184442 | A1 | 9/2004 | Jones et al. |
| 2004/0243718 | A1 | 12/2004 | Fujiyoshi |
| 2005/0027947 | A1 | 2/2005 | Landin |
| 2005/0033985 | A1 | 2/2005 | Xu et al. |
| 2005/0038898 | A1 | 2/2005 | Mittig et al. |
| 2005/0050364 | A1 | 3/2005 | Feng |
| 2005/0074001 | A1 | 4/2005 | Mattes et al. |
| 2005/0114492 | A1 | 5/2005 | Arberg et al. |
| 2005/0135422 | A1 | 6/2005 | Yeh |
| 2005/0169285 | A1 | 8/2005 | Wills et al. |
| 2005/0251856 | A1 | 11/2005 | Araujo et al. |
| 2006/0031506 | A1 | 2/2006 | Redgate |
| 2006/0062142 | A1 | 3/2006 | Appanna et al. |
| 2006/0063517 | A1 | 3/2006 | Oh et al. |
| 2006/0064440 | A1 | 3/2006 | Perry |
| 2006/0080446 | A1 | 4/2006 | Bahl |
| 2006/0126625 | A1 | 6/2006 | Schollmeier et al. |
| 2006/0195698 | A1 | 8/2006 | Pinkerton et al. |
| 2006/0227771 | A1 | 10/2006 | Raghunath et al. |
| 2007/0002857 | A1 | 1/2007 | Maher |
| 2007/0011419 | A1 | 1/2007 | Conti |
| 2007/0022479 | A1 | 1/2007 | Sikdar et al. |
| 2007/0124487 | A1 | 5/2007 | Yoshimoto et al. |
| 2007/0177506 | A1 | 8/2007 | Singer et al. |
| 2007/0180226 | A1 | 8/2007 | Schory et al. |
| 2007/0180513 | A1 | 8/2007 | Raz et al. |
| 2007/0294694 | A1 | 12/2007 | Jeter et al. |
| 2008/0034111 | A1 | 2/2008 | Kamath et al. |
| 2008/0034419 | A1 | 2/2008 | Mullick et al. |
| 2008/0040789 | A1 | 2/2008 | Chen et al. |
| 2008/0216177 | A1 | 9/2008 | Yokosato et al. |
| 2008/0289044 | A1 | 11/2008 | Choi |
| 2009/0049537 | A1 | 2/2009 | Chen et al. |
| 2009/0113536 | A1 | 4/2009 | Zhang et al. |
| 2009/0210698 | A1 | 8/2009 | Candelore |
| 2009/0234960 | A1 | 9/2009 | Kamiya et al. |
| 2010/0257278 | A1 | 10/2010 | Gunturu |
| 2010/0333209 | A1 | 12/2010 | Alve |
| 2011/0099623 | A1 | 4/2011 | Garrard et al. |
| 2011/0307606 | A1 | 12/2011 | Cobb |
| 2012/0117382 | A1 | 5/2012 | Larson et al. |
| 2012/0155495 | A1 | 6/2012 | Clee et al. |
| 2012/0215910 | A1 | 8/2012 | Wada |
| 2013/0089099 | A1 | 4/2013 | Pollock et al. |
| 2013/0191548 | A1 | 7/2013 | Boddukuri et al. |
| 2013/0212242 | A1 | 8/2013 | Mendiratta et al. |
| 2013/0227165 | A1 | 8/2013 | Liu |
| 2013/0262702 | A1 | 10/2013 | Davis |
| 2013/0311686 | A1 | 11/2013 | Fetterman et al. |
| 2014/0258536 | A1 | 9/2014 | Chiong |
| 2015/0047012 | A1 | 2/2015 | Chen et al. |
| 2015/0312092 | A1 | 10/2015 | Golshan et al. |
| 2015/0350383 | A1 | 12/2015 | Davis |
| 2016/0014126 | A1 | 1/2016 | Jalan et al. |
| 2016/0065619 | A1 | 3/2016 | Chen et al. |

FOREIGN PATENT DOCUMENTS

| | | |
|---|---|---|
| CN | 101495993 A | 7/2009 |
| CN | 101878663 | 11/2010 |
| CN | 101495993 B | 2/2011 |
| CN | 103365654 | 10/2013 |
| CN | 103428261 | 12/2013 |
| CN | 101878663 B | 6/2014 |
| EP | 1482685 | 12/2004 |
| EP | 1720287 | 11/2006 |

(56) References Cited

FOREIGN PATENT DOCUMENTS

| | | |
|---|---|---|
| EP | 2057552 | 5/2009 |
| EP | 2215863 | 8/2010 |
| EP | 2575328 | 4/2013 |
| EP | 2667571 | 11/2013 |
| EP | 2575328 B1 | 11/2014 |
| HK | 1188498 | 5/2014 |
| HK | 1190539 | 7/2014 |
| HK | 1182547 | 4/2015 |
| JP | 2004350188 | 12/2004 |
| JP | 2005518595 | 6/2005 |
| JP | 2006180295 | 7/2006 |
| JP | 2006333245 | 12/2006 |
| JP | 2007048052 | 2/2007 |
| JP | 2008217532 | 9/2008 |
| JP | 2009219065 | 9/2009 |
| JP | 2011505752 | 2/2011 |
| JP | 2013059122 | 3/2013 |
| JP | 2013070423 | 4/2013 |
| JP | 2013078134 | 4/2013 |
| JP | 5364101 | 9/2013 |
| JP | 5480959 | 2/2014 |
| JP | 5579820 B2 | 8/2014 |
| JP | 5579821 B2 | 8/2014 |
| TW | 269763 | 2/1996 |
| TW | 375721 | 12/1999 |
| TW | 425821 | 3/2001 |
| TW | 444478 | 7/2001 |
| WO | WO03073216 | 9/2003 |
| WO | WO03103233 | 12/2003 |
| WO | WO2006065691 | 6/2006 |
| WO | WO2007076883 | 7/2007 |
| WO | WO2008021620 | 2/2008 |
| WO | WO2009073295 | 6/2009 |
| WO | WO2015164026 | 10/2015 |

OTHER PUBLICATIONS

Chiussi et al., "A Network Architecture for MPLS-Based Micro-Mobility", IEEE WCNC 02, Orlando, Mar. 2002.

Extended Search Report dated Feb. 28, 2013 for European Application No. 12196986.9.
Final Office Action dated Apr. 28, 2010 for U.S. Appl. No. 11/501,607.
Final Office Action dated Feb. 17, 2011 for U.S. Appl. No. 11/501,607.
International Search Report dated May 21, 2009 for PCT Application No. PCT/US2008/081647.
International Search Report dated Sep. 23, 2008 for PCT Application No. PCT/US2007/071716.
Non-Final Office Action dated Apr. 30, 2012 for U.S. Appl. No. 13/397,718.
Non-Final Office Action dated Mar. 7, 2011 for U.S. Appl. No. 11/947,755.
Non-Final Office Action dated Oct. 15, 2009 for U.S. Appl. No. 11/501,607.
Non-Final Office Action dated Sep. 2, 2010 for U.S. Appl. No. 11/501,607.
Notice of Allowance dated Dec. 28, 2012 for U.S. Appl. No. 13/284,869.
Notice of Allowance dated Feb. 1, 2013 for U.S. Appl. No. 13/347,027.
Notice of Allowance dated Jul. 8, 2013 for U.S. Appl. No. 13/666,979.
Notice of Allowance dated May 30, 2012 for U.S. Appl. No. 13/397,718.
Notice of Allowance dated Oct. 4, 2012 for U.S. Appl. No. 11/501,607.
Notice of Allowance dated Sep. 20, 2011 for U.S. Appl. No. 11/947,755.
Smith, M. et al; "Network Security Using NAT and NAPT", 10th IEEE International Converence on Aug. 27-30, 2002, Piscataway, NJ, USA, 2012; Aug. 27, 2002; pp. 355-360.
Wang et al., "Shield: Vulnerability Driven Network Filters for Preventing Known Vulnerability Exploits", SIGCOMM'04, Aug. 30-Sep. 3, 2004, Portland, Oregon, USA.

* cited by examiner

Packet Pre-processor 112

1202 – Determines if Packet 400 is an HTTP packet and includes a valid HTTP header.

1205 – Examines Packet 400 to match Header Field Identifier 405

1210 – Extract information associated with Header Field Identifier 405

1212 – Generates Header Field Block 430

1216 – Modifies Header Field Indicator 425

1220 – Examines Packet 400 to match Sub-Header Field Identifier 407

1222 – Extract information associated with Sub-Header Field Identifier 407

1223 – Generates Header Field Block 480; Modifies Header Field Indicator 425 for Sub-header Field Identifier 407

Figure 2a

Processor Module 113

1251 – Determines if Summary Block 420 indicates a valid HTTP header.

1260 – Retrieves Service Policy 310 using Header Report Block 410.

1261 – Obtains Header Field Value 437 using Header Field Block 430; Retrieves Service 310 based on Header Field Value 437.

1263 – Obtains Sub-header Field Value 487 using Sub-Header Field Block 480; Retrieves Service 310 based on Sub-Header Field Value 487.

1270 – Applies Service Policy 310 to Packet 400.

1272 – Establishes HTTP Session 350 with Server 210 using Packet 400.

1275 – Modifies Packet 400 by removing Sub-header Field Identifier 407.

1280 – Creates Session Entry 390.

Figure 2b

PROCESSING PACKET HEADER WITH HARDWARE ASSISTANCE

CROSS-REFERENCE TO RELATED APPLICATIONS

The present application is a continuation of, and claims the priority benefit of, U.S. Nonprovisional patent application Ser. No. 13/480,494, filed May 25, 2012, titled "Method to Process HTTP Header with Hardware Assistance", now U.S. Pat. No. 9,596,286, issued on Mar. 14, 2017. The disclosure of the above application is hereby incorporated by reference in its entirety, including all references cited therein.

FIELD

This invention relates generally to data communications, and more specifically, to a service gateway.

BACKGROUND

Server load balancers or application delivery controllers typically balance load among a plurality of servers based on the one or more network protocol addresses, such as IP, TCP, network, transport or application layer addresses, of connection request packets. They may perform deep packet inspection into the packet payload to examine the payload content for a hint to optimize load balancing. Optimization based on deep packet inspection techniques include load balancing based on URL, domain names, application protocol types, and user information in the payload content. In these scenarios, server load balancers do not modify the request packets initiated from the host.

As Web traffic increases, number of servers a server load balancer serves also increases. Deep packet inspection techniques are also refined, particularly for Hypertext Transfer Protocol (HTTP) type Web sessions. A server load balancer may choose to insert a load balancer specific cookie to store a server load balancer's preference such that when the same host requests a service again, the load balancer can detect the special cookie and select an appropriate server. The special cookie is inserted when a server responds to a HTTP request from a host, and is detected when the host sends a subsequent HTTP request to a service via the server load balancer. When the subsequent HTTP request is received, the server load balancer removes the special cookie before sending the HTTP request to a server.

The processing of insertion, detection, and removal of the cookie is computationally consuming. Much of the computational requirement is in the detection of various HTTP header fields and sub-header fields where the special cookie is to be inserted, detected or removed. Thus, there exists a need for the processing of identifying various header fields and sub-header fields is assisted by a special hardware processing module, so as to reduce the computational requirement to handle the special cookie.

BRIEF SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one embodiment of the present invention, a method for processing data packet headers, comprises: receiving a first packet from a host device, the first packet associated with a predetermined protocol, the first packet comprising a request for a network service; detecting a header field of the first packet; determining that the detected header field matches a predetermined header field identifier previously available to the packet pre-processor, the predetermined header field identifier associated with the network service; generating a header field block using information associated with the predetermined header field identifier; ascertaining the network service and identifying a server for processing the network service based at least in part on the generated header field block; and sending the first packet to a processor module of the service gateway for processing the packet based on the heard field block.

In one aspect of the present invention, in matching the predetermined header field identifier to the header field identifier in the data packet, and in generating the header report block, the hardware packet pre-processor is further enabled to: compare the header field identifier in the data header with a predetermined header field identifier configured onto the memory of the hardware packet pre-processor; and in response to determining that the header field identifier in the data header matches the predetermined header field identifier configured onto the memory of the hardware packet pre-processor, generate the header block report to comprise a header field block comprising: a header field location indicating a starting location of the header field corresponding to the header field identifier in the data packet header, and a header field size indicating a size or length of a value of the header field corresponding to the header field identifier in the data packet header.

In one aspect of the present invention, the method further comprises: configuring at least one predetermined sub-header field identifier onto the memory of the hardware packet pre-processor, wherein the hardware packet pre-processor is further enabled to detect at least one sub-header field identifiers within the header field of the data packet, match the predetermined sub-header field identifier to the sub-header field identifier in the data packet, and generate the header report block to further comprise information corresponding to the sub-header field identifier in the data packet.

In one aspect of the present invention, in matching the predetermined sub-header field identifier to the sub-header field identifier in the data packet, and in generating the header report block, the hardware packet pre-processor is further enabled to: compare the predetermined sub-header field identifier with characters within the header field corresponding to the header field identifier in the data packet header; and in response to finding a match between the predetermined sub-header field identifier and characters within the header field corresponding to the header field identifier in the packet header, generate the header block report to comprise a sub-header field block comprising: a sub-header field location indicating a starting location of a sub-header field corresponding to the sub-header field identifier in the packet header, and a sub-header field size indicating a size or length of a value of the sub-header field corresponding to the sub-header field identifier in the packet header.

In one aspect of the present invention, the processor module: receives the header report block from the hardware packet pre-processor; retrieves a service policy using the header report block, comprising: using the header field location and the header field size in the header field block, obtains a header field value in the packet header; and retrieves the service policy based on the header field value; and applies the service policy to the data packet.

In one aspect of the present invention, the processor module: receives the header report block from the hardware packet pre-processor; retrieves a service policy using the header report block, comprising: using the sub-header field location and the sub-header field size in the sub-header field block, obtains a sub-header field value in the packet header; and retrieves the service policy based on the sub-header field value; and applies the service policy to the data packet.

In one aspect of the present invention, the header field comprises a HTTP cookie header field.

In one aspect of the present invention, the processor module further: modifies the header field of the data packet; and sends the modified data packet to the host or the server.

In one aspect of the present invention, in modifying the header field of the data packet and sending the modified data packet to the host or the server, the processor module: modifies the header field of the data packet by removing the sub-header field; and sends the modified data packet to the server.

In one aspect of the present invention, in modifying the header field of the data packet and sending the modified data packet to the host or the server, the processor module: modifies the header field of the data packet by inserting a second sub-header field; and sends the modified data packet to the host.

A service gateway corresponding to the above-summarized methods are also described and claimed herein.

BRIEF DESCRIPTION OF THE DRAWINGS

Embodiments are illustrated by way of example and not by limitation in the figures of the accompanying drawings, in which like references indicate similar elements.

FIG. 2a illustrates an embodiment of a packet pre-processor processing an HTTP packet.

FIG. 2b illustrates an embodiment of a processor module processing a header report block.

DETAILED DESCRIPTION OF THE INVENTION

Figure 1:
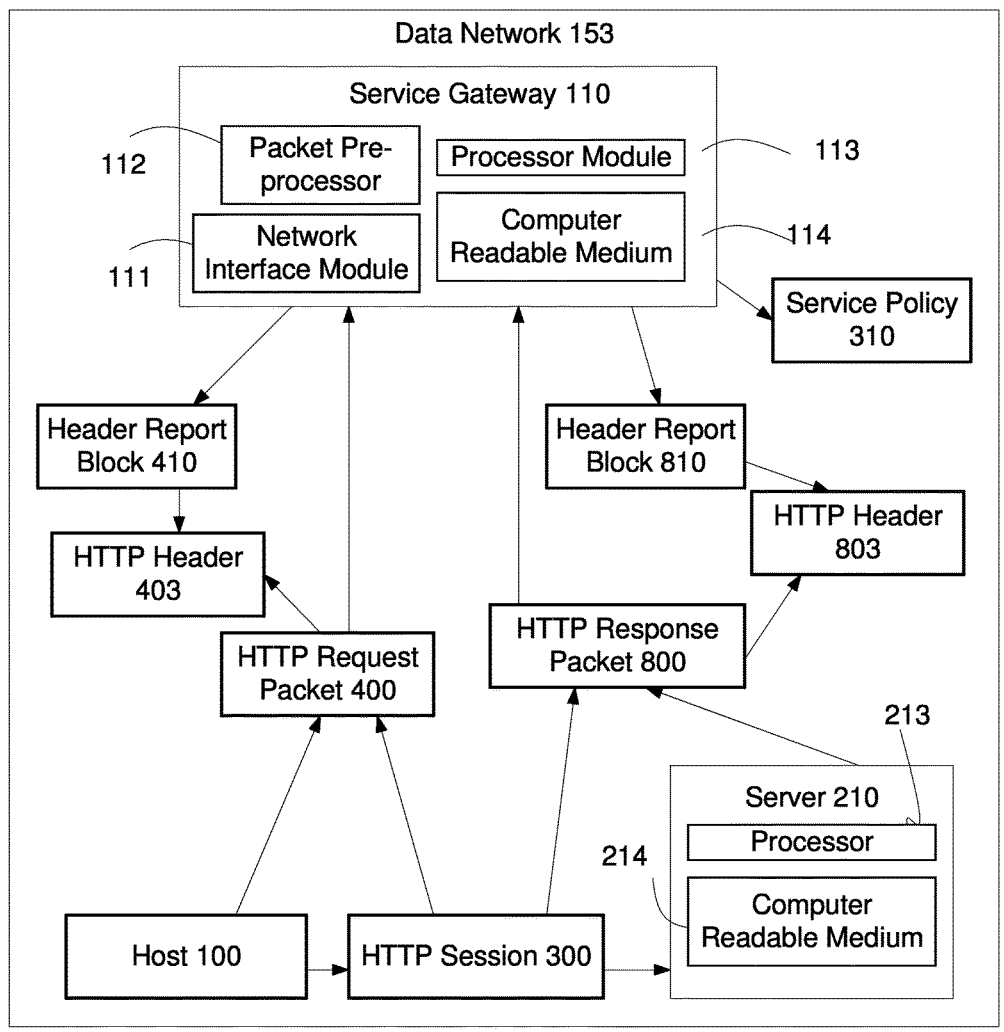
FIG. 1 illustrates an embodiment of a HTTP session processing method using a service gateway having a packet pre-processor according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In an embodiment illustrated in FIG. 1, a service gateway 110 processes a HTTP (Hypertext Transport Protocol) session 300 between a host 100 and a server 210. HTTP session 300 is delivered over a data network 153.

In one embodiment, data network 153 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 153 resides in a data center, or connects to a network or application network cloud.

Host 100 is a computing device with network access capabilities. In one embodiment, host 100 is a workstation, a desktop personal computer or a laptop personal computer, a Personal Data Assistant (PDA), a tablet PC, a smartphone, or a cellular phone, a set-top box, an Internet media viewer, an Internet media player, a smart sensor, a smart medical device, a net-top box, a networked television set, a networked DVR, a networked Blu-ray player, or a media center.

Service gateway 110 is operationally coupled to a processor module 113, a packet pre-processor 112, a network interface module 111, and a computer readable medium 114. The computer readable medium 114 stores computer readable program code, which when executed by the processor module 113, implements the various embodiments of the present invention as described herein. In some embodiments, service gateway 110 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HTTP server handling the HTTP layer of the HTTP service session 300, or a gateway performing network address translation (NAT).

Processor module 113 typically includes one or more general processors or micro-processors. In one embodiment, processor module 113 includes a multi-core microprocessor. In one embodiment, processor module 113 includes a memory unit storing variables used during execution of the computer readable program code stored in computer readable medium 114.

Network interface module 111 connects to data network 153. Network interface module 111 receives data packets from host 100 and sends data packets to host 100, and receives data packets from server 210 and sends data packets to server 210.

Packet pre-processor 112 is a hardware-based packet processing module, comprising simple but fast processing capabilities to process data packets received by network interface module 111. In one embodiment, packet pre-processor 112 includes a field programmable gate array (FPGA) module, an application specific integrated circuit (ASIC), a micro-controller, or a circuitry capable of performing the processing needs of packet pre-processor 112.

Server 210 is operationally coupled to a processor 213 and a computer readable medium 214. The computer readable medium 214 stores computer readable program code, which when executed by the processor 213, implements the various embodiments of the present invention as described herein. In some embodiments, the computer readable program code implements server 210 as a Web server, a file server, a video server, a database server, an application server, a voice system, a conferencing server, a media gateway, a media center, an app server or a network server providing a network or application service to host 100 using the HTTP protocol.

Typically, host 100 establishes HTTP session 300 by sending a HTTP request packet 400 through data network 153 and service gateway 110 to server 210. Upon processing the HTTP request packet 400, server 210 sends a HTTP response packet 800 back to host 100 via data network 153 and service gateway 110. HTTP request packet 400 includes HTTP request header 403, and HTTP response packet 800 includes HTTP response header 803.

Service gateway 110 received HTTP request packet 400 from host 100 through network interface module 111. Network interface module 111 sends HTTP request packet 400 to packet pre-processor 112. Packet pre-processor 112 examines HTTP request packet 400, generates a header report block 410, and sends HTTP request packet 400 and header report block 410 to processor module 113. Processor module 113 receives HTTP request packet 400 and header report block 410. Processor module 113 selects server 210 based on HTTP request packet 400, header report block 410 and a service policy 310. Processor module 113 sends HTTP request packet 400 to server 210. In one embodiment, processor module 113 modifies HTTP request packet 400 based on header report block 410 and service policy 310 prior to sending the modified HTTP request packet 400 to server 210.

In one embodiment, service gateway 110 receives HTTP response packet 800 from server 210. Service gateway 110 receives HTTP response packet 800 through network interface module 111. Network interface module 111 sends HTTP response packet 800 to packet pre-processor 112. Packet pre-processor 112 examines HTTP response packet 800 generates a header report block 810, and sends the HTTP response packet 800 and the header report block 810 to the processor module 113. Processor module 113 receives HTTP response packet 800 and header report block 810. Processor module 113 processes HTTP response packet 800 based on header report block 810 and service policy 310. Processor module 113 sends HTTP response packet 800 to host 100. In one embodiment, processor module 113 modifies HTTP response packet 800 based on header report block 810 and service policy 310 prior to sending the modified HTTP response packet 800 to host 100.

Figure 2C:
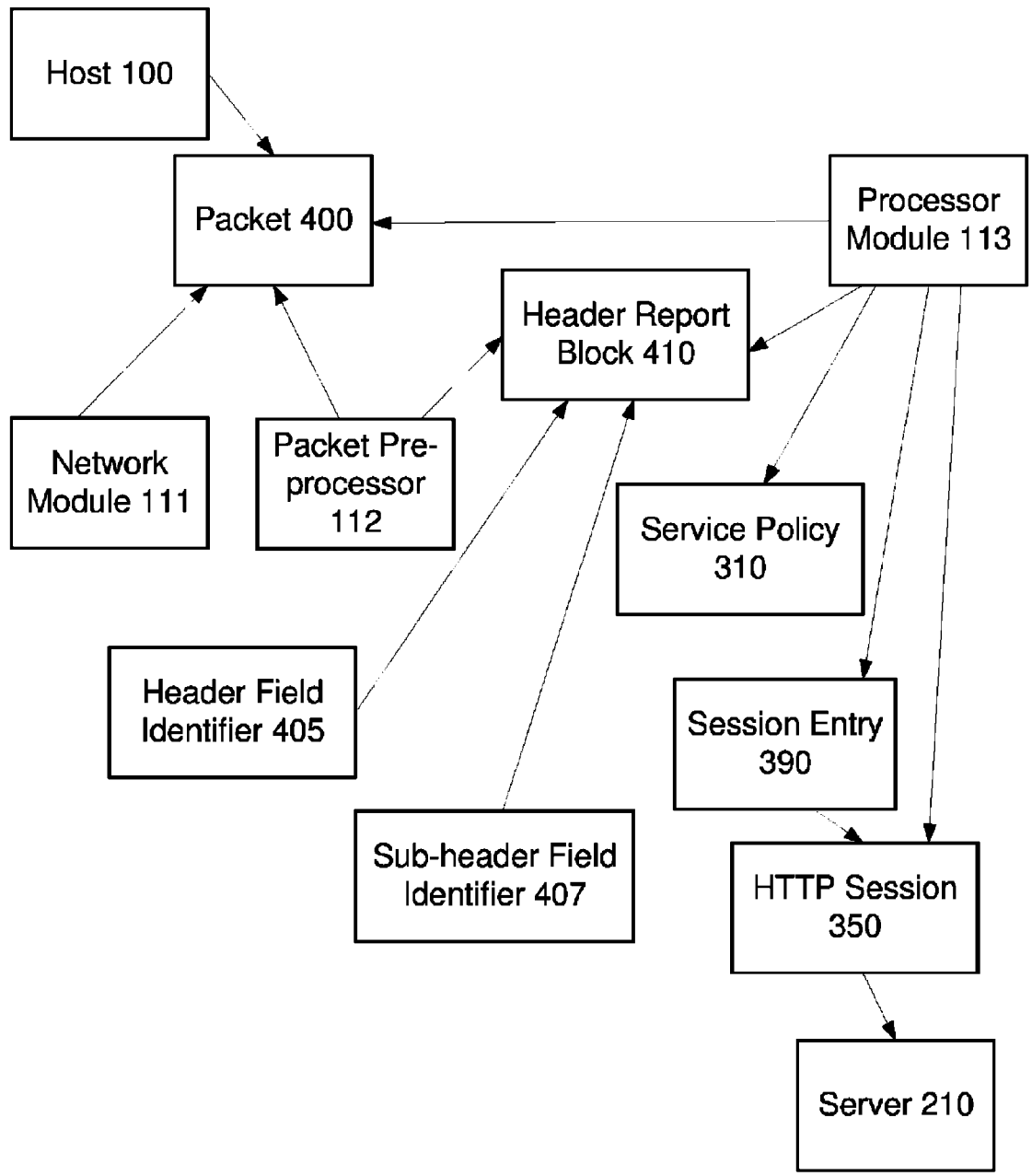
FIG. 2c illustrates an embodiment of the service gateway processing of a HTTP request packet according to the present invention.

FIG. 2c illustrates an embodiment of the service gateway 110 processing a HTTP request packet 400. As mentioned in FIG. 1, network module 111 of service gateway 110 receives HTTP request packet 400. Network module 111 sends packet 400 to packet pre-processor 112. Packet pre-processor 112 examines packet 400 to generate header report block 410.

Figure 3:
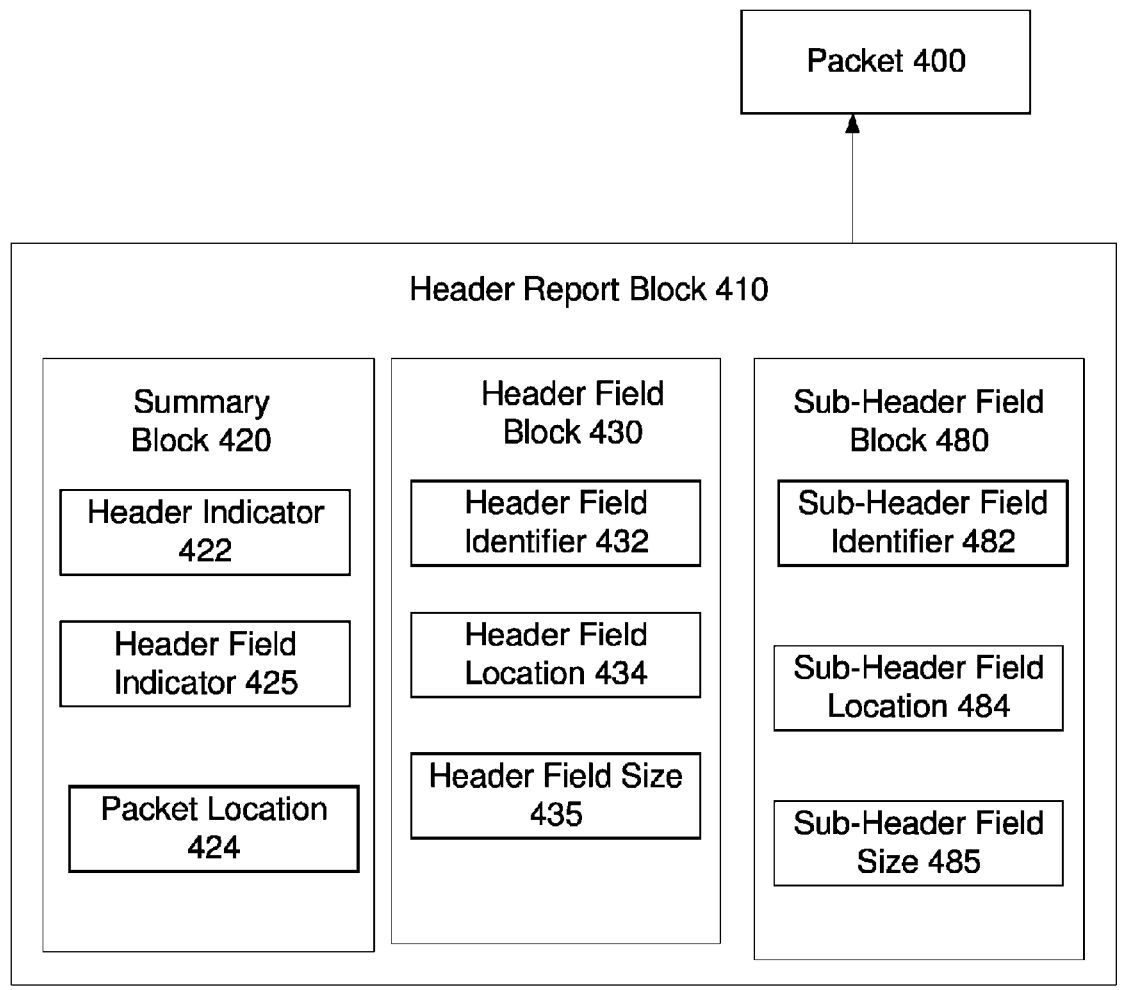
FIG. 3 illustrates an embodiment of a header report block according to the present invention.

FIG. 3 illustrates an embodiment of the header report block 410. In one embodiment, header report block 410 includes summary block 420 and optionally a header field block 430. In one embodiment, summary block 420 includes a header indicator 422, indicating if packet 400 includes a valid HTTP header. In one embodiment, summary block 420 includes a packet location 424 indicating the starting location of the HTTP content in a packet 400. In one embodiment packet location 424 indicates the HTTP content excluding the HTTP header, in packet 400. In one embodiment, summary block 420 includes header field indicator 425 indicating if header field block 430 is included in header report block 410. In one embodiment, header report block 410 also includes a sub-header field block 480, and header field indicator 425 also indicates if sub-header field block 480 is included in header report block 410.

In one embodiment, header field block 430 includes a header field identifier 432 identifying a header field in the HTTP header. In one embodiment, header field block 430 includes a header field location 434 indicating a starting location of the header field corresponding to header field identifier 432 in packet 400. In one embodiment, header field block 430 includes a header field size 435 indicating the size or length of the value of the header field corresponding to header field identifier 432.

In one embodiment, sub-header field block 480 includes a sub-header field identifier 482 identifying a sub-header field within the header field corresponding to the header field identifier 432. In one embodiment, sub-header field block 480 includes a sub-header field location 484 indicating a starting location of the header field corresponding to sub-header field identifier 482 in packet 400. In one embodiment, sub-header field block 480 includes a sub-header field size 485 indicating the size or length of the value of the sub-header field corresponding to sub-header field identifier 482.

FIG. 2a illustrates an embodiment of a packet pre-processor processing an HTTP packet. As illustrated in FIG. 2a, packet pre-processor 112 examines packet 400 to determine if packet 400 includes a valid HTTP header (1202), as described further below with reference to FIG. 4.

Upon determining that packet 400 includes a valid HTTP header, packet pre-processor 112 examines packet 400 to determine if the packet 400 includes a header field matching a predetermined header field identifier 405 (1205). In one embodiment, header field identifier 405 is stored in packet pre-processor 112 prior to the processing of the packet 400. In one embodiment, header field identifier 405 is configured by processor module 113 onto an internal memory of packet pre-processor 112 prior to the processing of the packet 400. Upon successfully matching header field identifier 405 in packet 400, packet pre-processor 112 extracts information associated with header field identifier 405 in packet 400 that are used to generate header field block 430 (1210). The header field block 430 is then generated, where header field identifier 432 of header field block 430 is associated with header field identifier 405 (1212). Packet pre-processor 112 modifies header field indicator 425 in summary block 420 of header report block 410 to indicate that header field identifier 405 is included in packet 400 (1216).

In one embodiment, packet pre-processor 112 determines header field identifier 405 is not included in packet 400. Packet pre-processor 112 modifies header field indicator 425 to indicate that header field identifier 405 is not included in packet 400. In response, packet pre-processor 112 does not generate header field block 430. The process of matching header field identifier 405 in packet 400 is described further below with reference to FIG. 5. Examples of header field identifier 405 include "Host", "Server", "Content", "Cookie", "Cookie2", "Set-Cookie", and "Set-Cookie2".

In one embodiment, packet pre-processor 112 further examines packet 400 for a sub-header field matching a predetermined a sub-header field identifier 407 (1220). In one embodiment, sub-header field identifier 407 is stored in packet pre-processor 112 prior to the processing of packet 400. In one embodiment, sub-header field identifier 407 is configured by processor module 113 onto packet pre-processor 112 prior to the processing of packet 400. Upon successfully determining that sub-header field identifier 407 is in packet 400, packet pre-processor 112 extracts information associated with sub-header field identifier 407 in packet 400 that are used to generate header field report 480 (1222). The header field block 480 is then generated, where sub-header field identifier 482 of sub-header field block 480 is associated with sub-header field identifier 407 (1223). Packet pre-processor 112 further modifies header field indicator 425 to indicate that sub-header field identifier 407 is included in packet 400. A process of matching sub-header field identifier 407 in packet 400 is described further below with reference to FIG. 6. Examples of sub-header field identifier 407 includes "Service-Group", "Std-sg" and other cookie name strings where sub-header field identifier 407 is a Cookie sub-header, Cookie-2 sub-header, a Set-Cookie sub-header, or a Set-Cookie2 sub-header. In one embodiment sub-header field identifier 407 includes the parent header field identifier. For example, sub-header field identifier 407 is "Cookie/Sto-sg".

In one embodiment, packet pre-processor 112 determines packet 400 does not include a valid HTTP header. In response, packet pre-processor 112 does not generate header report block 410. In one embodiment, packet pre-processor 112 generates header report block 410 with summary block 420 indicating no valid HTTP header is included in packet 400.

Returning to FIG. 2c, packet pre-processor 112 sends header report block 410 to processor module 113. In one embodiment, packet pre-processor 112 sends packet 400 together with header report block 410 to processor module 113. In one embodiment, packet pre-processor 112 sends header report block 410 after sending packet 400 to processor module 113.

FIG. 2b illustrates an embodiment of processor module 113 processing header report block 410. Processor module 113 receives packet 400 and header report block 410.

In one embodiment, processor module 113 receives header report block 410 and determines from summary block 420 that packet 400 includes a valid HTTP header (1251). Processor module 113 processes packet 400 using header report block 410. The processing of the packet 400 when processor module 113 does not receive header report block 410 or determines from summary block 420 of received header report block 410 that packet 400 does not contain a valid HTTP request header is outside the scope of the present invention.

In response to determining that packet 400 includes a valid HTTP header, processor module 113 retrieves a service policy 310 using header report block 410 (1260). In retrieving the service policy 310, assuming that header field block 430 of header report block 410 corresponds to header field identifier 432 "Server", processor module 113 obtains header field value 437 of header field "Server" from packet 400 (1261), by using header field location 434 and header field size 435 in header field block 430. Processor module 113 selects service policy 310 based on header field value 437. In one embodiment, sub-header field block 480 corresponds to the sub-header field identifier 407 "Service-Group". Processor module 113 obtains sub-header field value 487 of sub-header field identifier 407 from packet 400 (1263), by using sub-header field location 484 and sub-header field size 485 in sub-header field block 480. Processor module 113 retrieves service policy 310 based on sub-header field value 487.

Processor module 113 applies service policy 310 to packet 400 (1270). In one embodiment, processor module 113 selects server 210 based on service policy 310. In one embodiment, processor module 113 applies traffic management to packet 400 based on service policy 310. In one embodiment, processor module 113 applies security control to packet 400 based on service policy 310.

In one embodiment, processor module 113 establishes a HTTP session 350 with server 210 using HTTP request packet 400 (1272). In one embodiment, processor module 113 modifies HTTP request packet 400 prior to using the modified packet 400 to establish HTTP session 350 (1275). In one embodiment, sub-header field block 480 indicates a sub-header field of parent header field identifier "Cookie". Processor modules 113 removes the corresponding sub-header field associated with sub-header field block 480 from HTTP request packet 400. For example, sub-header field identifier 407 is "Sto-sg". Process module 113 removes the sub-header field identifier 407 "Sto-sg" from "Cookie" header field. In one embodiment, "Cookie" header field in packet 400 is "Cookie: user=frank; Sto-sg=201983578; session-id=8204". After modifying, the "Cookie" header field in modified packet 400 is "Cookie: user=frank; session-id=8204". Processor module 113 sends modified packet 400 to server 210 to establish HTTP session 350.

In one embodiment, processor module 113 creates a session entry 390 (1280) and stores information about HTTP session 300 with host 100 and HTTP session 350 with server 210. In one embodiment, processor module 113 associates session entry 390 with service policy 310.

In one embodiment, processor module 113 does not modify packet 400 before sending packet 400 to server 210 to establish HTTP session 350.

Figure 4:
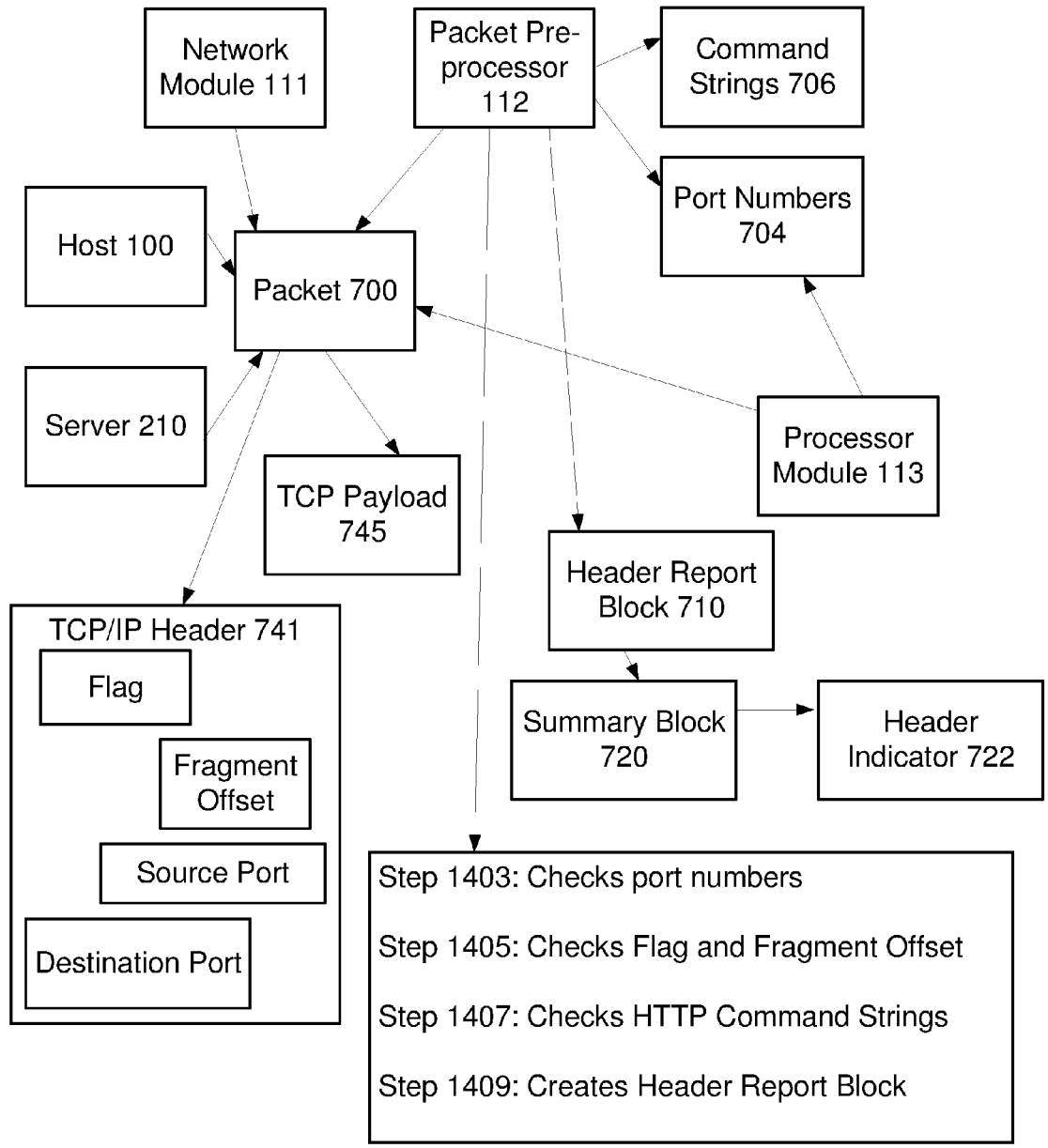
FIG. 4 illustrates an embodiment of the packet pre-processor identifying a HTTP request or response packet according to the present invention.

FIG. 4 illustrates an embodiment of the packet pre-processor identifying a HTTP request or response packet. In FIG. 4, packet pre-processor 112 examines packet 700 received from network interface module 111. Packet 700 may be a HTTP request packet from host 100, a HTTP response packet from server 210 or any other data packet. Packet pre-processor 112 processes packet 700 to determine if packet 700 includes a valid HTTP header. In one embodiment packet 700 includes a transmission control protocol (TCP) and Internet protocol (IP) packet header 741. In one embodiment, packet 700 includes an IP tunneling packet header. Examples of IP tunneling include L2TP tunneling, mobile IP tunneling, IP in IP tunneling, GPRS IP tunneling, IPv4 to IPv6 tunneling, IPv6 to IPv4 tunneling, IP MPLS tunneling or other IP tunneling protocols. Packet pre-processor 112 checks if TCP/IP packet header 741 indicates packet 700 is a HTTP packet (1403). In one embodiment, when packet 700 is a packet from host 100, packet pre-processor 112 compares TCP destination port number of packet 700 against a plurality of predetermined port numbers 704. In one embodiment, packet pre-processor 112 uses TCP source port number of packet 700 when packet 700 is received from server 210. The plurality of pre-determine port numbers 704 include, for example, port number 80, 8080, 8000, or at least one port number configured by processor module 113. If there is no match, packet pre-processor 112 determines the packet 700 is not a HTTP packet, and that packet 700 does not include a valid HTTP header. Otherwise, packet pre-processor 112 determines packet 700 may include a valid HTTP header.

In step 1405, packet pre-processor 112 checks the Flag and Fragment Offset of TCP/IP packet header 741 to determine if packet 700 is an IP packet fragment (1405). If packet 700 is an IP packet fragment, packet pre-processor 112 determines packet 700 does not include a valid HTTP header. Otherwise, packet pre-processor 112 determines packet 700 may include a valid HTTP header.

Packet pre-processor 112 compares the beginning portion of the TCP payload 745 of packet 700 against HTTP command strings 706 (1407), which includes: GET; GET [white space]; POST; POST[white space]; and HTTP/. If there is no match, packet pre-processor 112 determines packet 700 does not include a valid HTTP header. Otherwise, packet pre-processor 112 determines packet 700 may include a valid HTTP header.

In one embodiment, in 1403, 1405, and 1407, packet pre-processor 112 determines packet 700 may include a valid HTTP header. In response, packet pre-processor 112 generates header report block 710 (1409). If packet pre-processor 112 determines packet 700 does not include a valid HTTP header in 1403, 1405 or 1407, packet pre-processor 112, in one embodiment, does not generate a header report block 710. In one embodiment, packet pre-processor 112 generates a header report block 710 but stores in summary block 720 of header report block 710 a header indicator 722 indicating that packet 700 does not include a valid HTTP header. In one embodiment, packet pre-processor 112 determines packet 700 includes or may include a valid HTTP header. Packet pre-processor 112 stores in summary block 720 a header indicator 722 indicating a valid HTTP header is included in packet 700.

Figure 5:
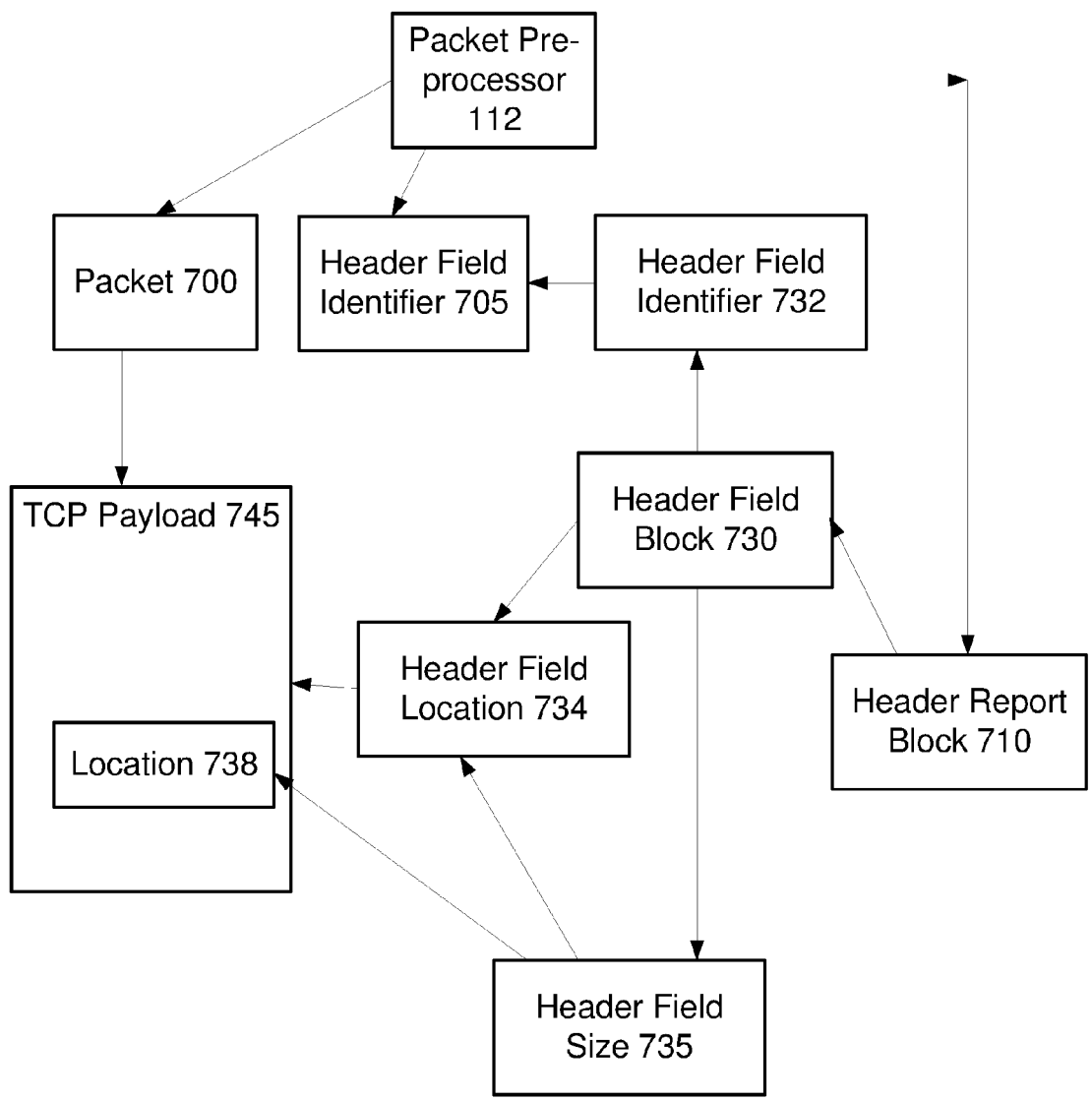
FIG. 5 illustrates an embodiment of the packet pre-processor identifying a HTTP header field according to the present invention.

FIG. 5 illustrates an embodiment of the packet pre-processor identifying a HTTP header field. Packet pre-processor 112 processes packet 700 for header field identifier 705, after packet pre-processor 112 determines packet 700 includes a valid HTTP header.

Packet pre-processor 112 compares header field identifiers in packet 700 with a character sequence comprising the combination of character '\n' (new-line or line-feed character or hex value 0x10), followed by header field identifier 705, followed by the character ':'. In one embodiment, the character sequence includes '\r' (carriage return character or hex value 0x13) prior to character '\n'. In one embodiment, packet pre-processor 112 starts the matching from the beginning location of the TCP payload 745 of packet 700, or in another embodiment, after the HTTP command matched in FIG. 4 in packet 700.

In one embodiment, a match is not found in packet 700. Packet pre-processor 112 determines packet 700 does not include header field identifier 705.

In various embodiments, a match is found. Packet pre-processor 112 determines packet 700 includes header field identifier 705. Packet pre-processor 112 generates header field block 730 corresponding to header field identifier 705 to include header field identifier 732. Packet pre-processor 112 records the header field location 734 of packet 700 where a match is found. Packet pre-processor 112 stores location 734 in header field block 730. Packet pre-processor 112 matches character '\n' starting from location 734. Packet pre-processor 112 finds a match of '\n' or '\r\n' in packet 700 at location 738. Packet pre-processor 112 calculates the header field size 735 of header field report 730 as a difference between location 738 and location 734 and stores the header field size 735 in the header field block 730. In one embodiment, the header field size 735 is the difference between location 738 and the location of the matched character ':'. In one embodiment, packet pre-processor 112 matches a sequence of linear white space characters such as the white space ' ' character or the tab '\t' character after the matched character ':'. The header field size 735 is the difference between location 738 and the first non-linear white space character after the matched character ':'.

Figure 6:
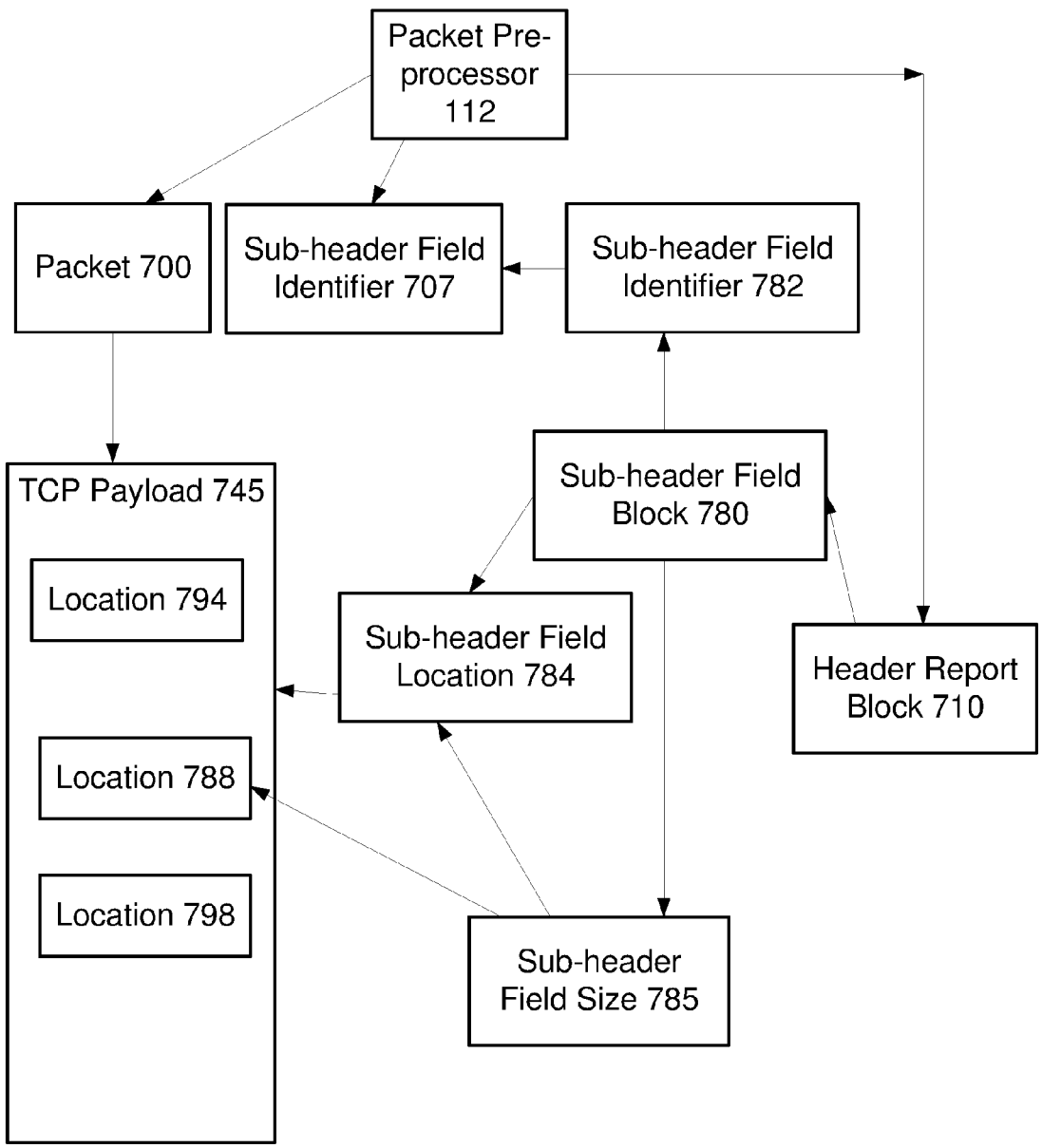
FIG. 6 illustrates an embodiment of the packet pre-processor identifying a HTTP sub-header field according to the present invention.

FIG. 6 an embodiment of the packet pre-processor identifying a HTTP sub-header field. Packet pre-processor 112 processes packet 700 for sub-header field identifier 707, after packet pre-processor 112 determines packet 700 includes a valid HTTP header. In one embodiment where packet 700 is a HTTP request packet, sub-header field identifier 707 is associated with a sub-header field of "Cookie". In one embodiment wherein packet 700 is a HTTP response packet, sub-header field identifier 707 is associated with a sub-header field of "Set-Cookie" or "Set-Cookie2".

In one embodiment, packet pre-processor 112 determines the header field location 794 and ending location 798 of header field identifier associated with "Cookie" as illustrated in FIG. 5. Packet pre-processor 112 proceeds to perform a comparison with sub-header field identifier 707 using location 794 and ending location 798 in packet 700. Packet pre-processor 112 compares using a character sequence combination of sub-header field identifier 707 and character '='.

In one embodiment, packet pre-processor 112 finds a match for sub-header field identifier 707 at location 784. In this embodiment location 784 is equal to or larger than location 794 and no larger than location 798. Packet pre-processor 112 proceeds to determine the size 785 of sub-header field identifier 707. In one embodiment, packet pre-processor 112 determines a first occurrence of non-linear white space character between a location of the matched character '=' and location 798, and a first occurrence of character ';' at location 788 after the first occurrence of non-linear white space character but before location 798. In one embodiment, packet pre-processor 112 calculates size 785 as a difference between location 784 and location 788. In one embodiment location 784 marks the determined first occurrence of non-linear white space character.

In one embodiment, packet pre-processor 112 does not find the character ";" between the matched first occurrence of non-linear white space character and location 798 in header report block 710, and packet pre-processor 112 uses location 798 as location 788 in calculating size 785.

In an embodiment where packet pre-processor 112 determines a match of sub-header field identifier 707 is found, packet pre-processor 112 creates a sub-header field block 780. Packet pre-processor 112 stores location 784 and size 785 as header field in with the sub-header field identifier 782 sub-header field block 780 of header report block 710.

In one embodiment, packet pre-processor 112 does not find a match for sub-header field identifier 707. Packet pre-processor 112 determines sub-header field identifier 707 is not included in the matched header field "Cookie" at location 794. In one embodiment, packet pre-processor 112 proceeds to match another header field "Cookie" in packet 700. In one embodiment, packet pre-processor 112 determines sub-header field identifier 707 is not included in packet 700. Packet pre-processor 112 does not generate header field block 780.

In FIGS. 4-6, packet pre-processor 112 matches packet 700 against a sequence of one or more characters. Such matching is known to those skilled in the art of FPGA, ASIC and other appropriate and capable hardware-based processing modules.

Figure 7:
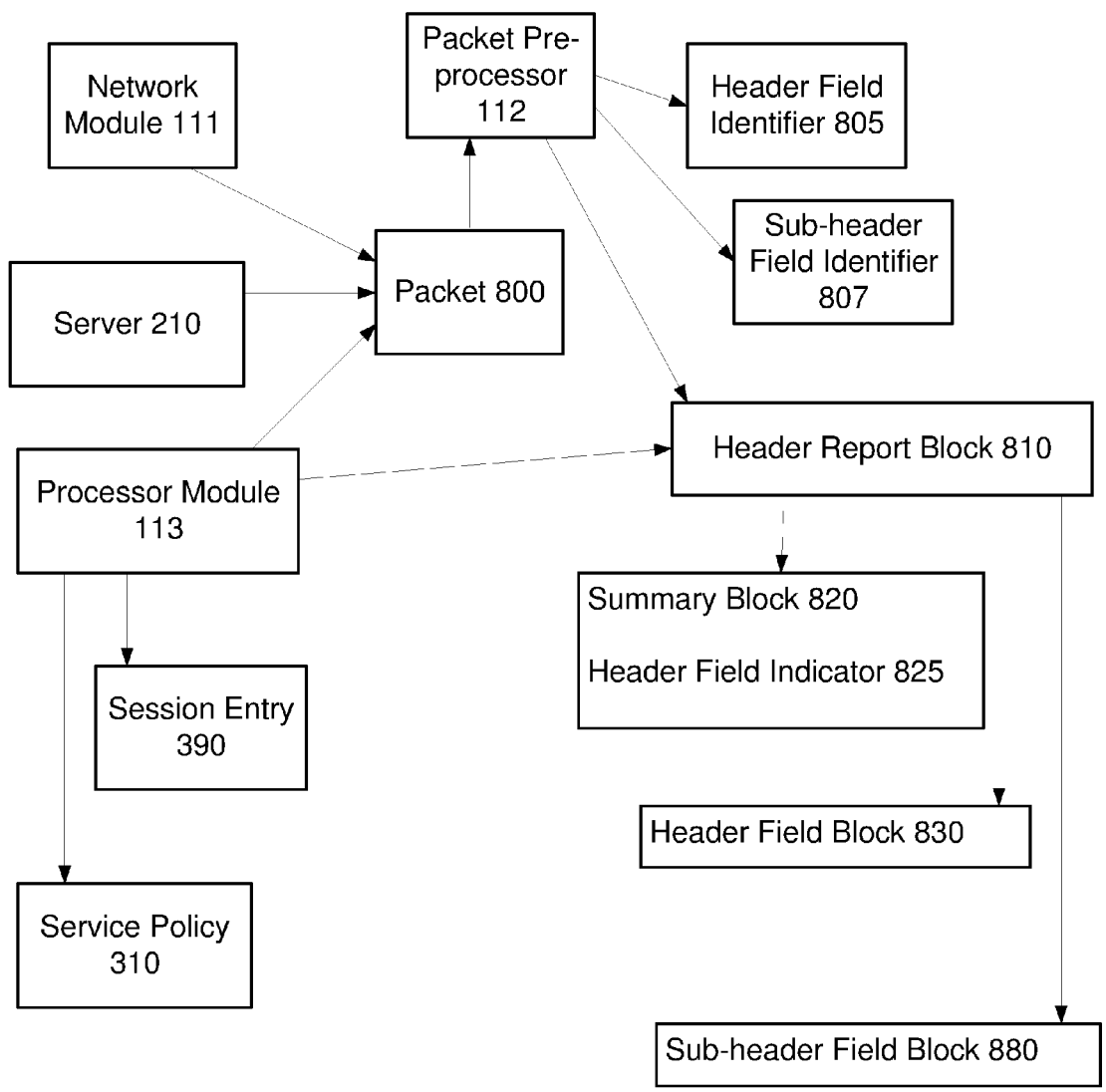
FIG. 7 illustrates an embodiment of the service gateway processing of a HTTP response packet according to the present invention.

FIG. 7 illustrates an embodiment of the service gateway 110 processing a HTTP response packet 800. Network module 111 of service gateway 110 receives HTTP response packet 800 from server 210. Network module 111 sends packet 800 to packet pre-processor 112. Packet pre-processor 112 examines packet 800 to generate header report block 810.

In one embodiment, header report block 810 includes summary block 820, optionally a header field block 830 and a sub-header field block 880. Summary block 820 includes a header indicator (not shown) indicating whether packet 800 includes a valid HTTP header and a header field indicator 825 indicating whether header field block 830 or sub-header field block 880 are included in header report block 810.

In one embodiment, header field block 830 corresponds to header field identifier 805. In one embodiment, sub-header field block 880 is associated with sub-header field identifier 807.

Packet pre-processor 112 examines packet 800 as illustrated in FIGS. 4-6 to generate header report block 810. Specifically header field identifier 805 is "Set-Cookie" or "Set-Cookie2", and sub-header field identifier 807 is a name string, such as "Service-Group", "Std-sg", or another name string as configured by processor module 113 onto packet pre-processor 112. Typically the sub-header field identifier 807 is a sub-header field of header field identifier 805.

In one embodiment, packet pre-processor 112 does not find header field identifier 805 or sub-header field identifier 807. Packet pre-processor 112 indicates the lack of the corresponding header field or sub-header field in header field indicator 825.

Processor module 113 receives packet 800 and possibly header report block 810 from the packet pre-processor 112. If processor module 113 does not receive header report block 810 or determines from summary block 820 of header report block 810 that packet 800 does not contain a valid HTTP header, processor module 113 processes packet 800 in a manner beyond the scope of the present invention.

In one embodiment, processor module 113 receives header report block 810 and determines from summary block 820 that packet 800 includes a valid HTTP header. Processor module 113 processes packet 800 using header report block 810.

In one embodiment, processor module 113 retrieves the session entry 390 using packet 800 information such as server 210 address, host 100 address, TCP source port and destination port numbers in packet 800. Processor module 113 further retrieves service policy 310 which is associated with session entry 390.

In one embodiment, processor module 113 checks header field indicator 825 if header field block 830 corresponding to "Set-Cookie" or "Set-Cookie2" is included in header report block 810. In one embodiment, the check fails. Processor module 113 modifies packet 800 by adding a header field corresponding to "Set-Cookie". In one embodiment, processor module 113 adds header field "\nSet-Cookie: Stg-sg=678" where value "678" of sub-header field "Stg-sg" is determined based on service policy 310. In one embodiment, value "678" is obtained from session entry 390. In one embodiment, sub-header field "Service-Group" is used in place of "Stg-sg". In one embodiment, sub-header field name string is obtained from session entry 390. In one embodiment, processor module 113 adds header field "\r \ nSet-Cookie: Stg-sg=678".

In one embodiment, header field block 830 corresponding to "Set-Cookie" or "Set-Cookie2" is included in header report block 810. Processor module 113 checks header field indicator 825 to determine if sub-header field block 880 is included. In one embodiment, sub-header field block 880 is not included in header report block 810. Processor module 113 modifies header field value corresponding to header field block 830 in packet 800. Processor module 113 inserts a sub-header field "Stg-sg=678;" into the HTTP header field corresponding to header field identifier 805. For example, header field identifier 805 is "Set-Cookie", and header field value of "Set-Cookie" in packet 800 is "Set-Cookie: User=90167CD". Processor module 113 changes header field value of "Set-Cookie" to "Set-Cookie: User=90167CD; Stg-sg=678". In one embodiment, processor module 113 changes header field value of "Set-Cookie" to "Set-Cookie: User=90167CD; Stg-sg=678 \r\n".

In one embodiment, sub-header field block 880 is included in header report block 810. Processor module 113 does not modify HTTP header of packet 800.

Processor module 113 sends modified packet 800 to host 100.

In one embodiment, packet 700 or packet 800 may include two or more of the same header fields such as two or more "Cookie" or "Set-Cookie" headers. In one embodiment, packet pre-processor 112 processes the first occurrence of the header. In one embodiment, packet pre-processor 112 processes the first occurrence of the header where the configured sub-header field is matched. In one embodiment, packet pre-processor 112 records in header report block 710 or header report block 810 the occurrence of multiple same header fields.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing data packets for load balancing by a processor module in conjunction with a packet pre-processor of a service gateway comprising, comprising:
    receiving a first packet from a host device, the first packet associated with a predetermined protocol, the first packet comprising a request for a network service;
    detecting a header field of the first packet;
    determining that the detected header field matches a predetermined header field identifier previously available to the packet pre-processor, the predetermined header field identifier associated with the network service;
    generating a header field block using information associated with the predetermined header field identifier;
    ascertaining the network service and identifying a server for processing the network service based at least in part on the generated header field block; and
    sending the first packet to a processor module of the service gateway for processing the packet based on the header field block.

2. The method of claim 1 wherein the predetermined protocol is Hypertext Transfer Protocol (HTTP) and the communications session is an HTTP session.

3. The method of claim 2 further comprising validating the first packet for the predetermined protocol.

4. The method of claim 1 wherein the header field block further comprises:
    a header field location indicating a starting location of the header field identifier; and
    a header field size indicating a size of the header field identifier.

5. The method of claim 1 further comprising:
    applying at least one of traffic management and security control associated with the network service to the first packet.

6. The method of claim 1 further comprising:
    locating a sub-header field block of the first packet, the sub-header field block having a sub-header field identifier; and
    ascertaining the network service further using the sub-header field identifier.

7. The method of claim 6 wherein the sub-header field block further comprises:
    a sub-header field location indicating a starting location of the sub-header field identifier; and
    a sub-header field size indicating a size of the sub-header field identifier.

8. The method of claim 7 further comprising:
    removing the sub-header field identifier from the first packet.

9. A system for packet processing for load balancing comprising:
    a packet pre-processor of a service gateway, the packet pre-processor being hardware based and performing a first method comprising:
        receiving a first packet from a host device, the first packet associated with a predetermined protocol, the first packet comprising a request for a network service;
        detecting a header field of the first packet;
        determining that the detected header field matches a predetermined header field identifier previously available to the packet pre-processor, the predetermined header field identifier associated with the network service;
        generating a header field block using information associated with the predetermined header field identifier;
    a processor module of the service gateway, the processor module executing instructions stored in a computer-readable medium to perform a second method comprising:
        receiving a second packet associated with a predetermined protocol,
        locating a header field block in the second packet, the header field block including a header field value, the header field value being associated with the service over a network,
        ascertaining the network service using the header field value of the second packet,
        identifying the server for processing the second packet using an association between the network service and the server, and
        directing the second packet to the identified server.

10. The system of claim 9 wherein the second method further comprises validating the second packet for the predetermined protocol.

11. The system of claim 9 wherein the header field block further comprises:
    a header field location indicating a starting location of the header field identifier; and a header field size indicating a size of the header field identifier.

12. The system of claim 9 wherein the second method further comprises:
applying at least one of traffic management and security control associated with the network service to the second packet.

13. The system of claim 9 wherein the second method further comprises:
locating a sub-header field block of the second packet, the sub-header field block having a sub-header field identifier; and
ascertaining the network service further using the sub-header field identifier.

14. The system of claim 13 wherein the sub-header field block further comprises:
a sub-header field location indicating a staring location of the sub-header field identifier; and
a sub-header field size indicating a size of the sub-header field identifer.

15. The system of claim 14 wherein the second method further comprises:
removing the sub-header field identifier from the second packet.

16. A non-transitory computer-readable storage medium having embodied thereon instructions, the instructions being executable by a processor to perform a method for load balancing, the method comprising:
receiving a first packet from a host device, the first packet associated with a predetermined protocol, the first packet comprising a request for a network service;
detecting a header field of the first packet;
determining that the detected header field matches a predetermined header field identifier previously available to the packet pre-processor, the predetermined header field identifier associated with the network service;
generating a header field block using information associated with the predetermined header field identifier;
ascertaining the network service and identifying a server for processing the network service based at least in part on the generated header field block; and
sending the first packet to a processor module of the service gateway for processing the packet based on the heard field block.

17. The non-transitory computer-readable storage medium of claim 16 wherein the predetermined protocol is Hypertext Transfer Protocol (HTTP) and the communications session is an HTTP session.

18. The non-transitory computer-readable storage medium of claim 16 wherein the header field block further comprises:
a header field location indicating a starting location of the header field identifier; and
a header field size indicating a size of the header field identifier.

19. The non-transitory computer-readable storage medium of claim 16 wherein the method further comprises:
applying at least one of traffic management and security control associated with the network service to the first packet.

20. The non-transitory computer-readable storage medium of claim 16 wherein the method further comprises:
locating a sub-header field block of the first packet, the sub-header field block having a sub-header field identifier; and
ascertaining the network service further using the sub-header field identifier.

* * * * *